(12) United States Patent
Yahagi et al.

(10) Patent No.: US 7,727,639 B2
(45) Date of Patent: *Jun. 1, 2010

(54) IRON-BASED SINTERED COMPACT AND METHOD FOR PRODUCTION THEREOF

(75) Inventors: Masataka Yahagi, Ibaraki (JP); Toru Imori, Ibaraki (JP); Atsushi Nakamura, Ibaraki (JP)

(73) Assignee: Nippon Mining & Metals Co., Ltd, Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 12/024,232

(22) Filed: Feb. 1, 2008

(65) Prior Publication Data

US 2008/0138642 A1     Jun. 12, 2008

Related U.S. Application Data

(63) Continuation of application No. 10/526,295, filed as application No. PCT/JP03/11153 on Sep. 1, 2003, now Pat. No. 7,347,969.

(30) Foreign Application Priority Data

Sep. 10, 2002   (JP)   ............................. 2002-263974

(51) Int. Cl.
  *B32B 15/18*   (2006.01)
  *B32B 5/14*   (2006.01)
(52) U.S. Cl. ...................... 428/681; 428/613; 428/687
(58) Field of Classification Search ........................ None
   See application file for complete search history.

(56) References Cited

U.S. PATENT DOCUMENTS

| | | | |
|---|---|---|---|
| 2,799,080 A | | 7/1957 | Duckworth |
| 4,000,982 A | * | 1/1977 | Ueda .......................... 428/545 |
| 5,595,608 A | * | 1/1997 | Takebuchi et al. ........... 148/104 |
| 6,132,487 A | | 10/2000 | Mori |
| 7,217,310 B2 | | 5/2007 | Yahagi et al. |
| 7,342,969 B2 | * | 3/2008 | Tate et al. .................... 375/257 |
| 2007/0231180 A1 | | 10/2007 | Imori et al. |
| 2007/0292298 A1 | | 12/2007 | Imori et al. |

FOREIGN PATENT DOCUMENTS

| | | | |
|---|---|---|---|
| JP | 61-034101 A | | 2/1986 |
| JP | 64-001522 A | | 1/1989 |
| JP | 04-176801 A | | 6/1992 |
| JP | 06-168807 A | | 6/1994 |
| JP | 06-290919 A | | 10/1994 |
| JP | 10-046201 A | | 2/1998 |
| JP | 11-329378 | * | 11/1999 |
| JP | 2003-003201 A | | 1/2003 |

OTHER PUBLICATIONS

"Sintering Furnaces and Atmospheres", ASM Handbook, vol. 7, pp. 453-467, Dec. 1998.

* cited by examiner

*Primary Examiner*—Jennifer C McNeil
*Assistant Examiner*—Jason L Savage
(74) *Attorney, Agent, or Firm*—Howson & Howson LLP

(57) ABSTRACT

An iron-based sintered body with a rustproof function comprises a layer containing 0.01 to 5 at % of indium on the surface of the iron-based sintered body, or an iron-based sintered body with a rustproof function contains 0.01 to 5 at % of indium throughout the sintered body, and the iron-based sintered body having iron as its principal component is manufactured by performing sintering in a gas atmosphere containing indium vapor or indium. Thereby obtained is an iron-based sintered body, as well as the manufacturing method thereof, capable of easily improving the rustproof effect without having to hardly change the conventional process.

3 Claims, No Drawings

IRON-BASED SINTERED COMPACT AND METHOD FOR PRODUCTION THEREOF

CROSS REFERENCE TO RELATED APPLICATIONS

This application is a continuation of U.S. application Ser. No. 10/526,295, filed Mar. 1, 2005, now U.S. Pat. No. 7,347,969 which is the National Stage of International Application No. PCT/JP03/11153, filed Sep. 1, 2003, which claims the benefit under 35 USC 119 of Japanese Application No. 2002-263974, filed Sep. 10, 2002.

BACKGROUND OF THE INVENTION

The present invention pertains to mixed powder for powder metallurgy to be employed in the manufacture of sintered components, brushes and so on, and particularly to an iron-based sintered body suitable in manufacturing the likes of iron-based sintered components superior in rustproof performance to be used as a solid lubricant or the like, and the manufacturing method thereof.

Generally, iron powder used in the application of sintered mechanical components, sintered oil retaining bearings, metal graphite brushes and so on rusts easily, and is commonly used upon mixing an organic rust-prevention agent such as benzotriazole therein.

Nevertheless, although such an organic rust-prevention agent possesses a temporary rustproof effect, it decomposes or evaporates at 500° C. or higher, and becomes lost at an ordinarily employed sintering temperature of 700° C. or higher. Therefore, the same condition will occur unless rust prevention is performed after the sintering, and there is a problem in that the sintered object will rust easily.

Meanwhile, in order to obtain the rustproof performance after sintering, a proposal has been made to form a composite powder sintered body by mixing a slight amount of metal powder such as zinc, bismuth, lead or the like with sintering powder having iron as its principal component.

However, this requires an additional step, the manufacturing process will become complex as a result thereof, and there is a problem in that there will be variations in the quality all that much more. Further, even if metal powder of bismuth or lead is mixed in, minute particles are merely dispersed, and it could not be said that it is evenly distributed.

As a conventional additive agent for powder metallurgy, there is an additive agent having organic acid cobalt metallic soap as its component, and technology for manufacturing a sintered body by adding and mixing this additive agent 0.1 to 2.0% by weight, and then molding and sintering this mixed powder has been disclosed (c.f. Japanese Patent Laid-Open Publication No. H10-46201).

Moreover, technology of adding and mixing metal stearate to rare earth-iron-boron permanent magnet coarse powder, which is mainly composed in atomic % of rare earth element R (among rare-earth elements containing Y, one or two or more elements are combined) of 10 to 25%, boron B of 1 to 12%, and the remaining part consisting of iron Fe (a part of Fe is replaced at least with one or more kinds of elements selected from Co, Ni, Al, Nb, Ti, W, Mo, V, Ga, Zn and Si in a range of 0 to 15%, if necessary), and thereafter dry-pulverizing this mixture has also been disclosed (c.f. Japanese Patent Laid-Open Publication No. H6-290919).

Further, a molding improving agent of alloy powder for a permanent magnet consisting of at least one kind selected from polyoxyethylene alkyl ether, polyoxyethylene mono-fatty acid ester and polyoxyethylene alkylallylether compounded with at least on kind of stearate at 1/20 to 5/1 compounding ratio has also been disclosed (c.f. Japanese Patent Laid-Open Publication No. S61-34101).

SUMMARY OF THE INVENTION

An object of the present invention is to provide an iron-based sintered body, as well as the manufacturing method thereof, capable of easily improving the rust-prevention effect without having to hardly change the conventional process.

As a result of intense study to resolve the foregoing problems, the present inventors discovered that the rust-prevention effect of products after sintering could be significantly improved by making indium exist at least on the surface of the sintered body.

Based on this discovery, the present invention provides an iron-based sintered body with a rustproof function, characterized in comprising a layer containing 0.01 to 5 at % of indium on the surface of the iron-based sintered body. Alternatively, the present invention provides an iron-based sintered body with a rustproof function characterized in containing 0.01 to 5 at % of indium throughout the sintered body. Further, the present invention provides a manufacturing method of an iron-based sintered body having iron as its principal component, characterized in that sintering is performed in a gas atmosphere containing indium vapor or indium.

DETAILED DESCRIPTION OF THE INVENTION

In order to improve the rustproof effect of the iron-based sintered body according to the present invention, the present inventors focused attention on zinc stearate to be added in a slight amount as a lubricant upon forming powder.

Nevertheless, this zinc stearate has a problem in that it dissipates during sintering, and damages the sintering furnace since it has high corrosiveness, and it has become evident that the rustproof effect is hardly any different from a case when it is additive-free.

As described above, in most cases, this zinc stearate is merely used as a lubricant upon molding, and is insufficient as a material for obtaining a high rustproof effect.

Here, in order to improve the rustproof effect even after sintering, it has become clear that as a result of sintering iron-based material powder in a gas atmosphere containing indium such as indium vapor or indium suboxide ($In_2O$), the rustproof function can be significantly improved by at least forming a layer containing 0.01 to 5 at % of indium on the surface of the iron-based sintered body, or including 0.01 to 5 at % of indium throughout the sintered body.

This rustproof effect is effective even with a slight amount of 0.01 at % or more. Although the rustproof effect can be expected with indium of 5 at % or more, the effect will be saturated, and further addition will be a waste. Thus, it is desirable to contain 0.01 to 5 at % of indium.

As the gas containing indium, compounds such as indium suboxide ($In_2O$) that decomposes with the heat of sintering may be used.

With this type of a sintered body containing 0.01 to 5 at % of indium, in order to increase the function as a molding lubricant, sintering may be performed upon adding metallic soap such as zinc stearate to the powder for powder metallurgy.

Particularly desirable is metallic soap of low-temperature volatile metal, and indium soap, bismuth soap, nickel soap, cobalt soap, copper soap, manganese soap and aluminum soap may be used as such low-temperature volatile metal.

Not only do these metals function as a molding lubricant, they are also capable of increasing the rustproof effect. Needless to say, indium soap is able to obtain extremely superior rustproof effect and lubricant effect.

Moreover, metallic soaps such as metallic soap stearate, metallic soap propionate and metallic soap naphthenate may be used as the soap.

As a result, the rustproof effect of sintered bodies can be improved exponentially without having to significantly change the conventional manufacturing process of a sintered body.

Generally, it is desirable to add 0.1 to 2.0 parts by weight of such metallic soap to 100 parts by weight of metallic powder for powder metallurgy having iron as its principal component.

Nevertheless, this additive amount may be changed in accordance with the type of sintered body, and the additive amount does not necessarily have to be limited to the foregoing additive amount. In other words, the additive amount may be arbitrarily set within a range that is capable of maintaining the characteristics of the target sintered body.

The condition for improving the rustproof effect is that the surface of the iron-based sintered body comprises a layer containing 0.01 to 5 at % of indium.

EXAMPLES AND COMPARATIVE EXAMPLES

Next, the present invention is described based on the Examples. The Examples are for facilitating the understanding of the invention, and the present invention is not in any way limited thereby. In other words, the present invention covers other Examples and modifications based on the technical spirit of the invention.

Example 1

1.0 wt % of graphite powder was mixed with iron powder (Hoganas reduced iron powder). This mixed powder (fill of 1.5 to 2.5 g) was molded into a test piece of approximately 10.06 mm$\phi$×2.70 to 4.55 mmH under a molding pressure of 6 t/cm$^2$.

The compact molded into this test piece was sintered in a batch type atmospheric furnace at a sintering temperature of 1150° C., sintering time of 60 min., with indium vapor introduced therein, and under a hydrogen gas atmosphere. 0.05 at % of indium was contained in the outermost surface portion of the sintered body after sintering.

This sintered body was set inside a constant temperature and humidity chamber, and an atmospheric exposure test was conducted for 336 hours at a temperature of 40° C. and humidity of 95% in order to conduct a moisture and oxidation resistance experiment. The results of the moisture and oxidation resistance experiment are shown in Table 1.

TABLE 1

|  | Indium Content in Surface Layer | Oxidation Resistance | | |
| --- | --- | --- | --- | --- |
|  |  | After 96 Hours | After 168 Hours | After 336 Hours |
| Example 1 | 0.05 at % | No change in color | Slight change in color | Slight change in color |
| Example 2 | 0.1 at % | No change in color | Slight change in color | Slight change in color |
| Example 3 | 0.5 at % | No change in color | Slight change in color | Slight change in color |
| Example 4 | 1 at % | No change in color | Slight change in color | Slight change in color |
| Example 5 | 3 at % | No change in color | Slight change in color | Slight change in color |
| Example 6 | 5 at % | No change in color | Slight change in color | Slight change in color |
| Example 7 | 0.05 at % | No change in color | Slight change in color | Slight change in color |
| Comparative Example 1 | 0 at % | Severe change in color | Severe change in color | Severe change in color |
| Comparative Example 2 | 0 at % | Severe change in color | Severe change in color | Severe change in color |
| Comparative Example 3 | 0.005 at % | Some change in color | Severe change in color | Severe change in color |

Examples 2 to 6

Under the same conditions, sintered bodies were prepared in which the indium content contained in the surface portion was changed to 0.1 at %, 0.5 at %, 1 at %, 3 at % and 5 at %, these sintered bodies were set inside a constant temperature and humidity chamber, and an atmospheric exposure test was conducted for 336 hours at a temperature of 40° C. and humidity of 95% in order to conduct a moisture and oxidation resistance experiment. The results of the moisture and oxidation resistance experiment are shown in Table 1.

Comparative Example 1

Zinc stearate SZ-2000 (manufactured by Sakai Chemical Industry Co., Ltd.) was used, and 0.8 wt % of this zinc stearate and 1.0 wt % of graphite powder were mixed with the iron powder. This mixed powder (fill of 1.5 to 2.5 g) was molded into a test piece of approximately 10.04 mmφ×2.73 to 4.58 mmH under a molding pressure of 6 t/cm$^2$.

The compact molded into this test piece was sintered in a batch type atmospheric furnace at a sintering temperature of 1150° C., sintering time of 60 min., and under a hydrogen gas atmosphere.

This sintered body was set inside a constant temperature and humidity chamber, and an atmospheric exposure test was conducted for 336 hours at a temperature of 40° C. and humidity of 95% in order to conduct a moisture and oxidation resistance experiment. The results of the moisture and oxidation resistance experiment are shown in Table 1.

Comparative Example 2

1.0 wt % of graphite powder was mixed with iron powder (Hoganas reduced iron powder). This mixed powder (fill of 1.5 to 2.5 g) was molded into a test piece of approximately 10.06 mmφ×2.70 to 4.55 mmH under a molding pressure of 6 t/cm$^2$.

The compact molded into this test piece was sintered in a batch type atmospheric furnace at a sintering temperature of 1150° C., sintering time of 60 min., without indium vapor introduced therein, and under a hydrogen gas atmosphere. An indium layer did not exist in surface of the sintered body.

This sintered body was set inside a constant temperature and humidity chamber, and an atmospheric exposure test was conducted for 336 hours at a temperature of 40° C. and humidity of 95% in order to conduct a moisture and oxidation resistance experiment. The results of the moisture and oxidation resistance experiment are shown in Table 1.

Comparative Example 3

Similarly, 1.0 wt % of graphite powder was mixed with iron powder (Hoganas reduced iron powder). This mixed powder (fill of 1.5 to 2.5 g) was molded into a test piece of approximately 10.06 mmφ×2.70 to 4.55 mmH under a molding pressure of 6 t/cm$^2$.

The compact molded into this test piece was sintered in a batch type atmospheric furnace at a sintering temperature of 1150° C., sintering time of 60 min., with a slight amount of indium vapor introduced therein, and under a hydrogen gas atmosphere. 0.005 at % of indium was contained in the outermost surface portion of the sintered body after sintering.

This sintered body was set inside a constant temperature and humidity chamber, and an atmospheric exposure test was conducted for 336 hours at a temperature of 40° C. and humidity of 95% in order to conduct a moisture and oxidation resistance experiment. The results of the moisture and oxidation resistance experiment are shown in Table 1.

Example 7

Synthesized indium stearate (In content of 12.0 wt %) was pulverized, and this was put through a sieve to obtain fine powder of 250 meshes or less.

0.8 wt % of this indium stearate (abbreviated as "In" in Table 1 above) and 1.0 wt % wt of graphite powder were mixed with the iron powder (Hoganas reduced iron powder). This mixed powder (fill of 1.5 to 2.5 g) was molded into a test piece of approximately 10.06 mmφ×2.70 to 4.55 mmH under a molding pressure of 6 t/cm$^2$.

The compact molded into this test piece was sintered in a batch type atmospheric furnace at a sintering temperature of 1150° C., sintering time of 60 min., with indium vapor introduced therein, and under a hydrogen gas atmosphere. 0.05 at % of indium was contained in the outermost surface portion of the sintered body after sintering.

This sintered body was set inside a constant temperature and humidity chamber, and an atmospheric exposure test was conducted for 336 hours at a temperature of 40° C. and humidity of 95% in order to conduct a moisture and oxidation resistance experiment. The results of the moisture and oxidation resistance experiment are shown in Table 1.

The moldability of the sintered body according to the present Example was extremely favorable since it is using indium stearate.

Likewise, results similar as Example 7 could be obtained in cases where soaps such as bismuth stearate (Bi content of 12.0 wt %), nickel stearate (Ni content of 12.0 wt %), cobalt stearate (Co content of 12.0 wt %), copper stearate (Cu content of 12.0 wt %), manganese stearate (Mn content of 12.0 wt %) or the compounds thereof were added to the iron powder (Hoganas reduced iron powder).

Next, as evident from Table 1, regarding Comparative Examples 1 to 3 in which a lubricant was not added to the iron powder, in the moisture resistance and oxidation resistance experiment after sintering, change in color (corrosion) occurred after 96 hours (4 days), and, together with the lapse in time, the degree of change in color increased gradually. The change in color was severe after 336 hours.

Meanwhile, with Examples 1 to 7 according to the present invention, it is clear that each of the Examples only has a slight change in color from the foregoing moisture resistance and oxidation resistance experiment after the lapse of 336 hours, and each of such Examples has moisture resistance and oxidation resistance properties.

Accordingly, it has been confirmed that the sintered body of the present invention containing a prescribed amount of indium in the surface portion thereof has favorable moisture resistance and oxidation resistance properties. Further, the moldability was favorable when using mixed powder for powder metallurgy to which metallic soap was added thereto, and the obtained result was that the corrosion resistance improved even more.

As described above, the present invention provides an iron-based sintered body, as well as the manufacturing method thereof, capable of easily and exponentially improving the rustproof effect without having to significantly change the conventional manufacturing process of a sintered body, and the rustproof effect of sintered bodies such as sintered mechanical components, sintered oil retaining bearings, metal graphite brushes and so on can thereby be improved remarkably.

The invention claimed is:

1. An iron-based sintered body, comprising a sintered body having iron as its principal component and having an outermost surface portion containing 0.01 to 5 at % of indium, said surface portion formed by decomposing indium on said outermost surface of the sintered body during sintering and providing said sintered body with a rustproof outer surface.

2. An iron-based sintered body according to claim 1, wherein said sintered body consists essentially of iron and graphite.

3. An iron-based sintered body consisting of iron and graphite further comprising an outermost surface portion on said sintered body containing 0.01 to 5 at % of indium, said surface portion formed by decomposing indium on said outermost surface of the sintered body during sintering, said indium providing said sintered body with a rustproof outer surface.

* * * * *